US012261264B2

(12) United States Patent
Lee et al.

(10) Patent No.: US 12,261,264 B2
(45) Date of Patent: *Mar. 25, 2025

(54) ELECTROLYTE MEMBRANE FOR ALL-SOLID-STATE BATTERY AND ALL-SOLID-STATE BATTERY INCLUDING THE SAME

(71) Applicant: LG ENERGY SOLUTION, LTD., Seoul (KR)

(72) Inventors: Jung-Pil Lee, Daejeon (KR); Sung-Joong Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 566 days.

This patent is subject to a terminal disclaimer.

(21) Appl. No.: 17/630,010

(22) PCT Filed: Nov. 13, 2020

(86) PCT No.: PCT/KR2020/016036
§ 371 (c)(1),
(2) Date: Jan. 25, 2022

(87) PCT Pub. No.: WO2021/096313
PCT Pub. Date: May 20, 2021

(65) Prior Publication Data
US 2022/0263115 A1    Aug. 18, 2022

(30) Foreign Application Priority Data
Nov. 15, 2019 (KR) .................. 10-2019-0147024

(51) Int. Cl.
*H01M 10/056* (2010.01)
*H01M 10/052* (2010.01)
(Continued)

(52) U.S. Cl.
CPC ....... *H01M 10/056* (2013.01); *H01M 10/052* (2013.01); *H01M 10/0525* (2013.01);
(Continued)

(58) Field of Classification Search
CPC .......... H01M 10/056; H01M 10/0525; H01M 10/4235; H01M 10/052; H01M 2300/0082; H01M 2300/0091; H01M 2300/0094
See application file for complete search history.

(56) References Cited

U.S. PATENT DOCUMENTS

| 4,828,945 A | 5/1989 | Nagata et al. |
| 6,645,675 B1 | 11/2003 | Munshi |

(Continued)

FOREIGN PATENT DOCUMENTS

| CN | 103874724 A | 6/2014 |
| CN | 106876784 A | 6/2017 |

(Continued)

OTHER PUBLICATIONS

International Search Report (PCT/ISA/210) issued in PCT/KR2020/016036, dated Feb. 10, 2021.
(Continued)

*Primary Examiner* — Eugenia Wang
(74) *Attorney, Agent, or Firm* — Birch, Stewart, Kolasch & Birch, LLP

(57) ABSTRACT

The solid electrolyte membrane according to the present disclosure forms an ion conduction-interrupting layer therein by polymer phase separation under a high temperature condition, such as an increase in internal temperature of a battery, and thus interrupts lithium ion transport. Therefore, it is possible to prevent thermal runaway and explosion of a battery by the formed ion conduction-interrupting layer (Continued)

(also referred to as interrupting layer), and thus to improve the heat resistance and safety of the battery.

15 Claims, 3 Drawing Sheets

(51) Int. Cl.
  *H01M 10/0525* (2010.01)
  *H01M 10/42* (2006.01)
(52) U.S. Cl.
  CPC .................. *H01M 10/4235* (2013.01); *H01M 2300/0082* (2013.01); *H01M 2300/0091* (2013.01); *H01M 2300/0094* (2013.01)

(56) References Cited

U.S. PATENT DOCUMENTS

| | | | |
|---|---|---|---|
| 8,703,310 | B2 | 4/2014 | Mullin et al. |
| 2009/0269645 | A1 | 10/2009 | Onodera |
| 2013/0130069 | A1 | 5/2013 | Mullin et al. |
| 2014/0234726 | A1 | 8/2014 | Christensen et al. |
| 2014/0272600 | A1 | 9/2014 | Bouchet et al. |
| 2016/0087306 | A1 | 3/2016 | Lee et al. |
| 2016/0336618 | A1* | 11/2016 | Lee .................. H01M 10/0565 |
| 2017/0092983 | A1 | 3/2017 | Pratt et al. |
| 2017/0250446 | A1 | 8/2017 | Kim et al. |
| 2018/0294524 | A1 | 10/2018 | Pratt et al. |
| 2019/0036165 | A1 | 1/2019 | Zhamu et al. |
| 2020/0203762 | A1 | 6/2020 | Park et al. |
| 2020/0235427 | A1 | 7/2020 | Kim et al. |
| 2021/0020945 | A1 | 1/2021 | Lee et al. |
| 2022/0069415 | A1 | 3/2022 | Lee et al. |

FOREIGN PATENT DOCUMENTS

| | | |
|---|---|---|
| CN | 108140440 A | 6/2018 |
| CN | 108475808 A | 8/2018 |
| CN | 110085904 A | 8/2019 |
| CN | 113692667 A | 11/2021 |
| EP | 0 951 080 B1 | 7/2001 |
| JP | 2003-508886 A | 3/2003 |
| JP | 2004-95342 A | 3/2004 |
| JP | 2005-220271 A | 8/2005 |
| JP | 2016-512649 A | 4/2016 |
| JP | 2018-533176 A | 11/2018 |
| JP | 2019-521475 A | 7/2019 |
| KR | 10-1997-0004136 B1 | 3/1997 |
| KR | 10-2009-0050097 A | 5/2009 |
| KR | 10-1747865 B1 | 6/2017 |
| KR | 10-2017-0100356 A | 9/2017 |
| KR | 10-2018-0102856 A | 9/2018 |
| KR | 10-2019-0127604 A | 11/2019 |
| WO | WO 2019/022522 A1 | 1/2019 |
| WO | WO 2020/226472 A1 | 11/2020 |

OTHER PUBLICATIONS

European Search Report for Appl. No. 20887744.9 dated Dec. 6, 2022.
Gray, F.M., et al, "Novel Polymer Electrolytes Based on ABA Block Copolymers," Macromolecules, Jan. 1, 1988, vol. 21, No. 2, pp. 392-397.
Young, N.P., et al, "Investigating polypropylene-poly(ethylene oxide)-polypropylene triblock copolymers as solid polymer electrolytes for lithium batteries," Solid State Ionics, Jun. 7, 2014, vol. 263, pp. 87-94.

* cited by examiner

ELECTROLYTE MEMBRANE FOR ALL-SOLID-STATE BATTERY AND ALL-SOLID-STATE BATTERY INCLUDING THE SAME

TECHNICAL FIELD

The present application claims priority to Korean Patent Application No. 10-2019-0147024 filed on Nov. 15, 2019 in the Republic of Korea. The present disclosure relates to an electrolyte membrane for an all-solid-state battery having improved heat resistance and safety and showing an improved shutdown function. In addition, the present disclosure relates to an all-solid-state battery comprising the membrane.

BACKGROUND ART

In a lithium-ion battery using a liquid electrolyte, the liquid electrolyte may be leaked to the outside of the battery, when the battery is deformed by impact or external environment, or the electrolyte may be combusted due to a short-circuit, or the like, resulting in a risk, such as overheating or explosion. Therefore, it can be said that development of a solid electrolyte capable of ensuring safety is a very important problem in the field of lithium-ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

In general, polymeric solid electrolyte, oxide-based solid electrolyte and sulfide-based solid electrolyte materials are used as solid electrolyte materials. When free-standing type electrolyte membranes are manufactured by using such solid electrolyte materials alone, defects, such as tearing or cracking, or separation of the electrolyte materials may occur during the manufacture or use of batteries. Particularly, when lithium metal is used as a negative electrode active material, there is a problem in that lithium dendrite is grown from the negative electrode surface and the grown lithium dendrite causes a short-circuit in a battery when it is in contact with a positive electrode. In an all-solid-state battery, a solid electrolyte membrane functions as an electrical insulator between a positive electrode and a negative electrode, instead of a separator. Particularly, when a polymeric material is used as a solid electrolyte, the solid electrolyte membrane may be damaged due to the growth of lithium dendrite. When the electrolyte membrane is damaged as mentioned above, electric current is concentrated at the damaged portion to cause rapid heat emission, resulting in ignition and explosion. Particularly, in the case of a large-size battery, a large amount of heat is generated by a short-circuit, and thus there is a problem in that the above-mentioned problem may become more serious. Therefore, there is a need for developing an electrolyte membrane capable of realizing a shut-down function rapidly, when a short-circuit occurs and a rapid increase in internal temperature of a battery occurs accordingly.

DISCLOSURE

Technical Problem

The present disclosure is designed to solve the problems of the related art, and therefore the present disclosure is directed to providing a solid electrolyte membrane provided with a shut-down function, and an all-solid-state battery including the same. These and other objects and advantages of the present disclosure may be understood from the following detailed description. Also, it will be easily understood that the objects and advantages of the present disclosure may be realized by the means shown in the appended claims and combinations thereof.

Technical Solution

According to the first embodiment of the present disclosure, there is provided a solid electrolyte membrane for an all-solid-state battery, which has an ion conductivity of $1 \times 10^{-7}$ S/cm or more at 20-30° C., and includes a mixture of a polymer material (A) and a solid electrolyte material (B), wherein the polymer material (A) has an ion conductivity of $9 \times 10^{-8}$ S/cm or less at 20-30° C.,
the solid electrolyte material (B) includes a polymer electrolyte (C) containing a lithium salt (C1) mixed with a polymer resin (C2),
the polymer resin (C2) is a block copolymer including a first segment and a second segment different from the first segment,
the first segment includes a first repeating unit having a polar group, and
the weight fraction of the first segment in the polymer resin (C2) is 70-99 wt %.

According to the second embodiment of the present disclosure, there is provided the solid electrolyte membrane for an all-solid-state battery as defined in the first embodiment, wherein the polymer material (A) is present at a ratio of 10-70 wt % based on 100 wt % of the solid electrolyte membrane.

According to the third embodiment of the present disclosure, there is provided the solid electrolyte membrane for an all-solid-state battery as defined in the first or the second embodiment, wherein the solid electrolyte material (B) has an ion conductivity of $1 \times 10^{-7}$ S/cm or more at 20-30° C.

According to the fourth embodiment of the present disclosure, there is provided the solid electrolyte membrane for an all-solid-state battery as defined in any one of the first to the third embodiments, wherein the polymer material (A) includes at least one selected from the following A1) to A6):

A1) a polyolefin-based polymer including at least one of ethylene, propylene, butylene and isobutylene as a repeating unit,
A2) a polystyrene-based polymer,
A3) a polyacrylate-based polymer, such as polymethyl methacrylate (PMMA),
A4) a polycarbide-based polymer,
A5) a polyester-based polymer, such as polyethylene terephthalate (PET), and
A6) a polylactone-based polymer, such as polylactone.

According to the fifth embodiment of the present disclosure, there is provided the solid electrolyte membrane for an all-solid-state battery as defined in the fourth embodiment, wherein the polymer material (A) further includes a copolymer including at least one of a segment having a polyolefin-based repeating unit, a segment having a polystyrene-based repeating unit, a segment having a polyacrylate-based repeating unit, a segment having a polycarbide-based repeating unit and a segment having a polyester-based repeating unit, and having an ion conductivity of $9\times10^{-8}$ S/cm or less at room temperature (about 20-30° C.).

According to the sixth embodiment of the present disclosure, there is provided the solid electrolyte membrane for an all-solid-state battery as defined in any one of the first to the fifth embodiments, wherein the polymer electrolyte material (B) has an ion conductivity of $1\times10^{-7}$ S/cm or more at room temperature, and the polymer resin (C2) includes a first repeating unit having a polar group including at least one polar element selected from oxygen, nitrogen and sulfur.

According to the seventh embodiment of the present disclosure, there is provided the solid electrolyte membrane for an all-solid-state battery as defined in any one of the first to the sixth embodiments, wherein the first segment includes at least one repeating unit(s) selected from ethylene oxide, carbonate, amide, imide, aspartic acid, acrylonitrile, peptide, acrylate, urethane, acrylamide, acrylic acid, vinyl acetate, vinylidene chloride and methyl methacrylate.

According to the eighth embodiment of the present disclosure, there is provided the solid electrolyte membrane for an all-solid-state battery as defined in any one of the first to the seventh embodiments, wherein the first segment has a molecular weight of 10-200 kg/mol.

According to the ninth embodiment of the present disclosure, there is provided the solid electrolyte membrane for an all-solid-state battery as defined in any one of the first to the eighth embodiments, wherein the polymer resin (C2) includes a block copolymer including a copolymer (PEO-b-PS) of the first segment containing an ethylene oxide repeating unit and the second segment containing a styrene repeating unit.

According to the tenth embodiment of the present disclosure, there is provided the solid electrolyte membrane for an all-solid-state battery as defined in the eighth embodiment, wherein the polymer material (A) of the solid electrolyte membrane includes polystyrene.

According to the eleventh embodiment of the present disclosure, there is provided the solid electrolyte membrane for an all-solid-state battery as defined in any one of the first to the tenth embodiments, wherein the second segment is present at a weight fraction of 20-50 wt % based on 100 wt % of the total weight of the polymer material (A) and the polymer resin (C2).

According to the twelfth embodiment of the present disclosure, there is provided the solid electrolyte membrane for an all-solid-state battery as defined in any one of the first to the eleventh embodiments, which induces phase separation between the solid electrolyte material (B) and the polymer material (A) depending on a change in temperature to form an ion conduction-interrupting layer including the polymer material (A) in the solid electrolyte membrane, wherein the change in temperature is an increase in temperature.

Advantageous Effects

The solid electrolyte membrane according to the present disclosure forms an ion conduction-interrupting layer therein by polymer phase separation under a high temperature condition, such as an increase in internal temperature of a battery, and thus interrupts lithium ion transport. Therefore, it is possible to prevent thermal runaway and explosion of a battery by the formed 'ion conduction-interrupting layer' (also referred to as 'interrupting layer' hereinafter), and thus to improve the heat resistance and safety of the battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
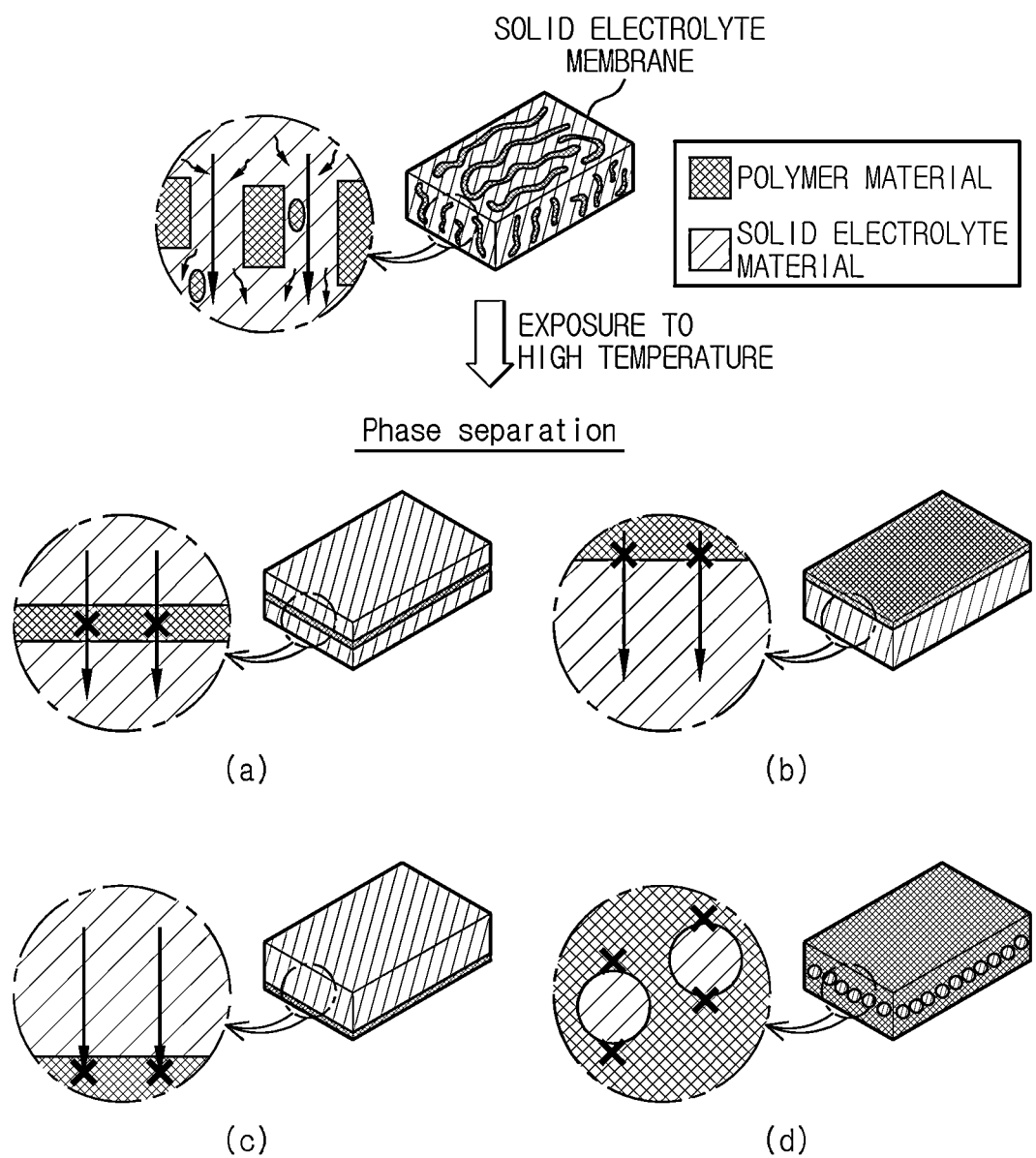
FIG. 1 is a schematic view illustrating the structure of the solid electrolyte membrane according to an embodiment of the present disclosure and the mechanism of forming an insulating film caused by phase separation.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements, unless otherwise stated.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to an electrolyte membrane for an all-solid-state battery and an all-solid-state battery including the same. The solid electrolyte membrane according to the present disclosure generally functions as an insulation barrier and ion conductive layer between a positive electrode and a negative electrode in a battery driving temperature range, and can control the driving of a battery through the formation of an ion conduction-interrupting layer, when the internal temperature of the battery is increased rapidly due to the generation of a short-circuit in the battery, or the like. According to the present disclosure, the ion conduction-interrupting layer is formed by melting and phase separation of a polymer material (A) having low ion conductivity and contained in the solid electrolyte membrane.

FIG. 1 is a schematic view illustrating the structure of the solid electrolyte membrane according to an embodiment of the present disclosure and the mechanism of formation of an insulation film through phase separation. Hereinafter, the solid electrolyte membrane according to the present disclosure will be explained in detail with reference to FIG. 1.

The solid electrolyte membrane according to the present disclosure is interposed between a positive electrode and a negative electrode of an all-solid-state battery and plays a role as an electrical insulating- and ion conductive-layer between the positive electrode and the negative electrode. According to an embodiment of the present disclosure, the solid electrolyte membrane has an ion conductivity of $1 \times 10^{-7}$ S/cm or more at 20-30° C. and may have a sheet-like shape having a thickness of 15-100 μm.

According to the present disclosure, the solid electrolyte membrane includes a polymer material (A) having low ion conductivity and a solid electrolyte material (B).

According to an embodiment of the present disclosure, the polymer material (A) has a low ion conductivity. Preferably, the polymer material (A) may have an ion conductivity of $9 \times 10^{-8}$ S/cm or less at room temperature (about 20-30° C.). According to an embodiment of the present disclosure, particular examples of the polymer material (A) include the following A1) to A6). For example, the polymer material (A) may include at least one selected from the following A1) to A6):

A1) a polyolefin-based polymer including at least one of ethylene, propylene, butylene and isobutylene as a repeating unit, A2) a polystyrene-based polymer, A3) a polyacrylate-based polymer, such as polymethyl methacrylate (PMMA), A4) a polycarbide-based polymer, A5) a polyester-based polymer, such as polyethylene terephthalate (PET), and A6) a polylactone-based polymer, such as polylactone.

In addition, according to an embodiment of the present disclosure, the polymer material (A) may include, in combination with the above-exemplified polymer materials or independently from the same, a copolymer including at least one of a segment having a polyolefin-based repeating unit, a segment having a polystyrene-based repeating unit, a segment having a polyacrylate-based repeating unit, a segment having a polycarbide-based repeating unit and a segment having a polyester-based repeating unit, and having an ion conductivity of $9 \times 10^{-8}$ S/cm or less at room temperature (about 20-30° C.). According to an embodiment of the present disclosure, the polymer material (A) may include a segment having a styrene-based repeating unit and/or may include a polystyrene homopolymer.

According to an embodiment of the present disclosure, the polymer material (A) has an ion conductivity of $9 \times 10^{-8}$ S/cm or less at room temperature (about 20-30° C.), and may include a block copolymer containing a first segment as described hereinafter. Herein, the weight fraction of the first segment in the block copolymer may be less than 10 wt %. For example, the polymer material (A) may include a copolymer (PEO-b-PS) of the second segment containing a styrene polymerization unit and the first segment containing an ethylene oxide polymerization unit, wherein the weight fraction of the first segment in PEO-b-PS is less than 10 wt %.

Meanwhile, according to an embodiment of the present disclosure, the polymer material (A) may have a molecular weight of 1-10,000 kg/mol, or 10-1,000 kg/mol. Within the above-defined range, the molecular weight is preferably 1 kg/mol or more, 5 kg/mol or more, or 10 kg/mol or more, in terms of the physical strength of the solid electrolyte membrane. In addition, when the molecular weight is excessively low, the polymer chain is too short to form a layered structure in the electrolyte membrane through phase separation. Meanwhile, in terms of molecular mobility and phase separation effect, the molecular weight is preferably 10,000 kg/mol or less.

According to an embodiment of the present disclosure, the polymer material (A) has a glass transition temperature (Tg) and/or melting point (Tm) of 150° C. or lower. When the melting point exceeds the above-defined range, the polymer material (A) cannot be molten and chain mobility cannot be realized, even when the internal temperature of a battery is increased, resulting in a failure in phase separation. Therefore, it is difficult to accomplish desired effects.

According to an embodiment of the present disclosure, the polymer material (A) (non-ion conductive) is preferably present at a ratio of about 10-70 wt % based on 100 wt % of the solid electrolyte membrane.

Next, the solid electrolyte material (B) will be explained. According to an embodiment of the present disclosure, the solid electrolyte material (B) has an ion conductivity of $1 \times 10^{-7}$ S/cm or more, $1 \times 10^{-6}$ S/cm or more, or $1 \times 10^{-5}$ S/cm or more at room temperature (20-30° C.), and may include a polymeric solid electrolyte material, an oxide-based solid electrolyte material, a sulfide-based solid electrolyte material, or two or more of them.

Preferably, the solid electrolyte material (B) may include a polymeric solid electrolyte material in an amount of 80 wt % or more, 90 wt % or more, or 99 wt % or more. According to an embodiment of the present disclosure, the solid electrolyte material (B) may include a polymeric solid electrolyte material in an amount of 100 wt %. As described hereinafter, the polymer material (A) and the solid electrolyte material (B) including a polymeric solid electrolyte material in the solid electrolyte membrane are molten at least partially under a high-temperature condition, and thus phase separation occurs between the polymer material (A) and the solid electrolyte material (B) in the solid electrolyte membrane. As a result, as shown in FIG. 1, an ion conduction-interrupting layer including the polymer material (A) may be formed in the solid electrolyte membrane. In other words, according to the present disclosure, the solid electrolyte material (B) preferably includes a polymeric solid electrolyte material in an amount within the above-defined weight percent range with a view to facilitating the phase separation of the polymer material (A).

According to an embodiment of the present disclosure, the solid electrolyte material (B) may be used in an amount of 20-90 wt %, based on 100 wt % of the solid electrolyte membrane. According to an embodiment of the present disclosure, the solid electrolyte material may be used in an amount of 30-90 wt %, 30-85 wt %, or 40-80 wt %, based on 100 wt % of the solid electrolyte membrane. When the content of the solid electrolyte material (B) satisfies the above-defined range, phase separation of the polymer materials contained in the solid electrolyte membrane is carried out effectively, after the solid electrolyte membrane is exposed to high temperature. Particularly, the polymer material (A), which is non-ion conductive or has low ion conductivity, may form an ion conduction-interrupting layer in a direction perpendicular to the thickness direction of the solid electrolyte membrane or horizontal to the solid electrolyte membrane.

The polymeric solid electrolyte material may be a composite of a lithium salt (C1) mixed with a polymer resin (C2), i.e. may be a polymeric electrolyte (C) formed by adding a polymer resin (C2) to a solvated a lithium salt (C1), and the polymeric electrolyte has an ion conductivity of $1 \times 10^{-7}$ S/cm or more at room temperature (20-30° C.).

According to an embodiment of the present disclosure, the polymer resin (C2) may include a copolymer. According to an embodiment of the present disclosure, the copolymer may include a random copolymer, block copolymer, graft copolymer or a combination thereof. The block copolymer is obtained by polymerizing any one kind of monomers to form a segment (or block) in which a repeating unit is repeated, polymerizing another kind of monomers to form a segment (or block), or the like. The graft copolymer is obtained by grafting of a backbone in which one kind of monomers are polymerized with a side chain in which another kind of monomers are polymerized.

According to the present disclosure, the polymer (C2) includes a block copolymer including a first segment and a second segment different from the first segment. The first segment includes a first repeating unit having a polar group including at least one polar element selected from oxygen, nitrogen and sulfur. The polymer is coordinated with ions dissociated from such elements to form a polymer-ion complex, thereby transporting lithium ions. According to an embodiment of the present disclosure, the block copolymer may have a structure in which any one end of the first segment including the first repeating units is linked to one end of the second segment including the second repeating units.

According to an embodiment of the present disclosure, the first segment may include ethylene oxide as a repeating unit. In addition, the first segment may include, in combination with ethylene oxide or independently from ethylene oxide, at least one repeating unit(s) selected from a repeating unit of polypropylene oxide (PPO), a repeating unit of polyacrylonitrile (PAN), a repeating unit of polyvinyl chloride (PVC), a repeating unit of polyvinylidene fluoride (PVDF), a repeating unit of polymethyl methacrylate (PMMA), a repeating unit of polysiloxane, a repeating unit of polypropylene carbonate (PPC) and a repeating unit of polyphosphazene. However, the scope of the present disclosure is not limited thereto. More particularly, the first segment may include at least one repeating unit(s) selected from ethylene oxide, carbonate, amide, imide, aspartic acid, acrylonitrile, peptide, acrylate, urethane, acrylamide, acrylic acid, vinyl acetate, vinylidene chloride and methyl methacrylate. According to an embodiment of the present disclosure, the first segment in the block copolymer may have a molecular weight (Mw) of 10-200 kg/mol. When the molecular weight is smaller than the above-defined range, the polymer flowability is increased but phase separation occurs hardly. When the molecular weight is larger than the above-defined range, the polymer chain flowability is reduced, thereby making it difficult to obtain desired effects.

According to the present disclosure, the second segment may include repeating units forming the polymer material (A). For example, the second segment may include: olefin-based repeating units, such as ethylene, isobutylene, butylene, propylene, or the like; repeating units of polystyrene-based polymers, such as styrene; acrylic repeating units, such as alkyl (meth)acrylate; repeating units of polycarbide-based polymers; ester-based repeating units, such as ethylene terephthalate (PET), polylactone-based repeating units; carbide-based repeating units, or the like. According to an embodiment of the present disclosure, the second segment may include at least one of the above-mentioned repeating units. According to an embodiment of the present disclosure, the second segment in the block copolymer may have a molecular weight (Mw) of 10-200 kg/mol. When the molecular weight is smaller than the above-defined range, the polymer flowability is increased but phase separation occurs hardly. When the molecular weight is larger than the above-defined range, the polymer chain flowability is reduced, thereby making it difficult to obtain an effect of forming an interrupting layer to a desired level.

According to a preferred embodiment of the present disclosure, the polymer resin (C2) may include a block copolymer (PEO-b-PS) including a first segment containing ethylene oxide repeating units and a second segment containing styrene repeating units. According to an embodiment of the present disclosure, the polymer material (A) may include polystyrene.

Meanwhile, according to an embodiment of the present disclosure, when the polymer resin (C2) has the above-described characteristics, the weight fraction of the second segment in the polymer resin (C2) may be 1-30 wt %, and the weight fraction of the first segment in the polymer resin (C2) may be 70-90 wt %. According to an embodiment of the present disclosure, the content of each segment may be determined by TGA (thermogravimetric analysis) or GC-mass (gas chromatography-mass spectrometry).

According to an embodiment of the present disclosure, the polymer resin (C2) may have a molecular weight (Mw) of 1-10,000 kg/mol. In terms of the physical strength of the solid electrolyte membrane, the molecular weight is preferably 1 kg/mol or more. Meanwhile, in terms of molecular mobility and phase separation effect, the molecular weight is preferably 10,000 kg/mol or less. Unless otherwise stated in the specification, 'molecular weight' means weight average molecular weight (Mw). For example, the molecular weight may be determined by using gel permeation chromatography (PL GPC220, Agilent Technologies).

Meanwhile, according to an embodiment of the present disclosure, it is preferred in terms of flowability during phase separation that the weight fraction of the part occupied by the second segment is 20-50 wt % based on 100 wt % of the total polymer ingredients including the polymer material (A) and the polymer resin (C2). Herein, the second segment refers to the second segment contained in the polymer resin (C2) and the second segment contained in the polymer material (A).

For example, when polystyrene (PS) is used as the polymer material (A) in the solid electrolyte membrane, polystyrene is a polymer including the second segment. Therefore, calculation of the weight fraction of the second segment based on 100 wt % of the total polymer ingredients including the polymer material (A) and the polymer resin (C2) includes the weight of polystyrene used as the polymer material (A).

According to an embodiment of the present disclosure, when PS is used as the polymer material (A) and PEO-b-PS is used as the polymer resin (C2), the ratio (weight fraction) of the combined weight of the PS segments in PEO-b-PS and PS based on 100 wt % of the total weight of PS and PEO-b-PS is 20-50 wt %.

In addition, as described above, when PEO-b-PS block copolymer is used as the polymer material (A), the PS segment contained therein is regarded as the second segment.

According to an embodiment of the present disclosure, when PEO-b-PS(A) is used as the polymer material (A) and PEO-b-PS(B) is used as the polymer resin (C2), the ratio (weight fraction) of the combined weight of the PS segment in PEO-b-PS(A) and the PS segment in PEO-b-PS(B) based on 100 wt % of the total weight of PEO-b-PS(A) and PEO-b-PS(B) is 20-50 wt %.

This will be understood more clearly through the following Examples and Comparative Example.

For example, in Example 1, polystyrene-co-polyethylene oxide (PS-b-PEO) is used as the polymer resin (C2) and polystyrene (PS) is used as the polymer material (A), wherein PS-b-PEO is a block copolymer in which the polystyrene (PS) segment is bound to the polyethylene oxide (PEO) segment at each end thereof. Herein, the weight fraction of the PS segment based on the total weight of the polymer material PS and the polymer resin PS-b-PEO is 38.95 wt %.

Meanwhile, in Example 3, polystyrene-co-polyethylene oxide (PS-b-PEO) having different properties (ion conductivity, or the like) are used individually as the polymer material (A) and the polymer resin (C2). In this case, the weight fraction of the PS segment based on the total weight of the polymer material (A) and the polymer resin (C2) is 41.12375 wt %.

In the electrolyte according to the present disclosure, the lithium salt is an ionizable lithium salt and may be represented by $Li^+X^-$. The anion of lithium salt is not particularly limited and particular examples thereof include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN®$, $(CF_3CF_2SO_2)_2N^-$, or the like.

According to the present disclosure, the solid electrolyte membrane has a thickness of about 100 μm or less, preferably about 15-90 μm. Within the above-defined range, the solid electrolyte membrane may have an adequate thickness, considering ion conductivity, physical strength, energy density of an applicable battery. For example, in terms of ion conductivity and energy density, the thickness may be 80 μm or less, 70 μm or less, 60 μm or less, or 50 μm or less. Meanwhile, in terms of physical strength, the thickness may be 20 μm or more, 30 μm or more, or 40 μm or more.

As described above, in the solid electrolyte membrane according to an embodiment of the present disclosure, phase separation between the solid electrolyte material (B) and the polymer material (A) is induced according to a change in temperature, particularly an increase in temperature, thereby forming an ion conduction-interrupting layer including the polymer material (A) in the solid electrolyte membrane. In other words, the polymer material (A) having low ion conductivity and contained in the solid electrolyte membrane is molten under a specific temperature condition and forms an ion conduction-interrupting layer in the solid electrolyte membrane according to a phase separation behavior (see, FIG. 1). Ion conduction between a positive electrode and a negative electrode is interrupted by the formation of such an ion conduction-interrupting layer. In this manner, operation of a battery may be interrupted. In other words, a battery stops driving, when the internal temperature of the battery is increased rapidly. Therefore, it is possible to prevent any further increase in temperature or explosion of the battery caused by such an increase in temperature.

FIG. 1 is a schematic view illustrating the structure of the solid electrolyte membrane according to an embodiment of the present disclosure and the mechanism of formation of an interrupting layer through phase separation. In FIG. 1, the green colored portion represents the solid polymer material (B) and the yellow colored portion represents the polymer material (A). In addition, the black arrow mark shows lithium ion migration. Under a general battery driving temperature condition, the polymer material (A) is distributed randomly in the solid electrolyte membrane and does not disturb lithium ion conduction between a positive electrode and a negative electrode. Therefore, the solid electrolyte membrane shows ion conductivity derived from the solid electrolyte material (B). Meanwhile, when the internal temperature of the battery is increased, the polymer material (A) and the solid electrolyte material (B) have increased flowability. Particularly, when the solid electrolyte material (B) includes a polymeric solid electrolyte material as a main ingredient, the solid electrolyte membrane is molten to cause phase separation between the polymeric solid electrolyte material and the polymer material. As a result, the polymer material (A) forms an interrupting layer with a layered structure in the solid electrolyte membrane, thereby interrupting ion conduction.

The interrupting layer refers to a structure formed through the concentration of the polymer material (A) at a local site with a high concentration and inhibiting ion conduction, and is not limited to any specific shape. For example, the interrupting layer may be formed in the solid electrolyte membrane or on any one surface of the solid electrolyte membrane with a layered structure. Such a layered structure may be formed totally at a predetermined depth or on the surface of the solid electrolyte membrane, or may have a layer-like shape formed by aggregation of droplets of molten polymer. FIG. 1 schematically illustrates various embodiments of the interrupting layer. When the interrupting layer is developed according to an increase in battery temperature, ion conduction is interrupted and battery driving is stopped, resulting in improvement of the heat resistance and safety of the battery.

For example, the solid electrolyte membrane according to an embodiment of the present disclosure may be obtained by the following method, but is not limited thereto. Particularly, the following description relates to an embodiment which uses a polymer electrolyte (C) as a solid electrolyte material (B).

First, a polymer electrolyte (C) and a polymer material (A) are introduced to a suitable solvent to prepare a polymer solution for forming a solid electrolyte membrane. According to an embodiment of the present disclosure, a lithium salt, a polymer resin (C2) and a polymer material (A) may be introduced at the same time, or may be introduced sequentially.

The polymer solution may have a concentration controlled adequately to allow homogeneous coating of the solid electrolyte membrane, and the concentration is not particularly limited. The solvent may be any solvent with no particular limitation, as long as it does not cause any change in the ingredients introduced thereto and can be removed subsequently through a drying process. Any suitable solvent may be selected depending on the ingredients introduced thereto. For example, when an alkylene oxide-based polymer, such as polyethylene oxide (PEO), is used as a polymer resin (C2), acetonitrile may be used as a solvent. Next, the polymer solution is applied to a release sheet, such as a terephthalate film, followed by molding into a film having a predetermined thickness. The application and molding may be carried out by using a known coating process, such as doctor blade coating. Then, the resultant film is dried, and the solvent is removed to obtain a solid electrolyte membrane. Meanwhile, according to an embodiment of the present disclosure, the solid electrolyte membrane may further include 10 wt % or less of a binder resin, if necessary.

In another aspect of the present disclosure, there is provided an all-solid-state battery including the above-described solid electrolyte membrane. The all-solid-state battery includes a positive electrode, a negative electrode and a solid electrolyte membrane. According to an embodiment of the present disclosure, the negative electrode may include lithium metal as a negative electrode active material.

According to the present disclosure, each of the positive electrode and the negative electrode may include a current collector and an electrode active material layer formed on at least one surface of the current collector, wherein the electrode active material layer may include a plurality of electrode active material particles and a solid electrolyte material. According to an embodiment of the present disclosure, a current collector itself may be used as a negative electrode, while not forming an active material layer on the surface of the current collector. In addition, each electrode may further include at least one of a conductive material and a binder resin, if necessary. Additionally, each electrode may further include various additives in order to supplement or improve the physicochemical properties of the electrode.

According to the present disclosure, in the case of a negative electrode, lithium metal may be used as a negative electrode active material for a lithium-ion secondary battery. In addition to lithium metal, any material used conventionally as a negative electrode active material may be used. For example, the negative electrode active material may include at least one selected from: carbon such as non-graphitizable carbon, graphitic carbon, or the like; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; $0 < x \leq 1$; $1 \leq y \leq 3$; $1 \leq z \leq 8$); lithium alloys; silicon-based alloys; tin-based alloys; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like.

In the case of a positive electrode, the electrode active material may be any material used conventionally as a positive electrode active material for a lithium-ion secondary battery. For example, the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1), $Li_aMn_xNi_yCo_zO_4$ (wherein $0.5 < a < 1.5$, $0 < [x, y, z] < 1$, $x+y+z=1$), or $Li_2Mn_3MO_8$ (wherein M is Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to the present disclosure, the current collector includes a metal plate having electrical conductivity and may be one selected suitably depending on polarity of electrodes known in the field of secondary batteries.

According to the present disclosure, the conductive material is added generally in an amount of 1-30 wt % based on the total weight of the mixture including the electrode active material. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, Ketjen black, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to the present disclosure, the binder resin is not particularly limited, as long as it is an ingredient which assists binding of the electrode active material with the conductive material, and binding to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer terpolymer (EPDM), sulfonated EPDM, styrene butadiene rubber, fluororubber, various copolymers, or the like. In general, the binder resin may be used in an amount of 1-30 wt %, or 1-10 wt %, based on 100 wt % of electrode active material layer.

Meanwhile, according to the present disclosure, each electrode active material layer may include at least one additive, such as an oxidation stabilizing additive, a reduction stabilizing additive, a flame retardant, a heat stabilizer, an anti-fogging agent, or the like, if necessary.

According to the present disclosure, the solid electrolyte material contained in the electrode may include at least one of a polymeric solid electrolyte, an oxide-based solid electrolyte and a sulfide-based solid electrolyte. Reference will be made to the above description about the polymeric solid electrolyte material.

The oxide-based solid electrolyte contains oxygen (O), and has conductivity of metal ions that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \leq x \leq 1$, $0 \leq y \leq 1$), $LiAl_xZr_{2-x}(PO_4)_3$ (wherein $0 \leq x \leq 1$, $0 \leq y \leq 1$), $LiTi_xZr_{2-x}(PO_4)_3$ (wherein $0 \leq x \leq 1$, $0 \leq y \leq 1$), LISICON compounds, LIPON compounds, perovskite compounds, NASICON compounds and LLZO compounds. However, the scope of the present disclosure is not limited thereto.

The sulfide-based solid electrolyte contains sulfur (S), has conductivity of metal ions that belong to Group1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, or the like. However, the scope of the present disclosure is not limited thereto.

Referring to the solid electrolyte material, in the case of a positive electrode, an electrolyte material having high oxidation stability may be used as a solid electrolyte. In addition, in the case of a negative electrode, an electrolyte having high reduction stability may be used as a solid electrolyte. However, the scope of the present disclosure is not limited thereto. Since the solid electrolyte mainly functions to conduct lithium ions in the electrodes, any material having a high ion conductivity, such as $10^{-7}$ S/Cm or more, or $10^{-5}$ S/cm or more, may be used, and the solid electrolyte material is not limited any specific ingredient.

In still another aspect of the present disclosure, there is provided a secondary battery having the above-described structure. There are also provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

EXAMPLES

1. Manufacture of Solid Electrolyte Membrane

Example 1

First, a polystyrene-polyethylene oxide block copolymer (polystyrene-co-polyethylene oxide, PS-b-PEO) and polystyrene (PS, molecular weight (Mw): 7 kg/mol) were introduced to tetrahydrofuran (THF) as a solvent at a weight ratio of 9:1 to prepare a 5 wt % polymer solution. Herein, PS-b-PEO was a copolymer including a polystyrene (PS) segment and polyethylene oxide (PEO) segment bound to each other at each end thereof. In the copolymer, the PS segment had a molecular weight (Mw) of 18.5 kg/mol and the PEO segment had a molecular weight (Mw) of 39 kg/mol. In addition, the weight fraction of the PS segment in PS-b-PEO was 28.95 wt %. Further, the weight fraction of the PS segment based on the total weight of the polymer material PS and the polymer resin PS-b-PEO was 38.95 wt %. Herein, LiTFSI as a lithium salt was also introduced thereto at a molar ratio of [EO]/[Li$^+$]=18/1. The polymer solution was agitated overnight at 60° C. so that the PS-b-PEO, PS and lithium salt introduced thereto might be dissolved sufficiently. The polymer solution was coated on a release film through spin coating at 1000 rpm for 1 minute and dried overnight at room temperature under vacuum. In this manner, a solid electrolyte membrane was obtained. The resultant solid electrolyte membrane had a thickness of about 30 µm.

Example 2

First, a polystyrene-polyethylene oxide block copolymer (polystyrene-co-polyethylene oxide, PS-b-PEO) and polystyrene (PS, molecular weight (Mw): 7 kg/mol) were introduced to tetrahydrofuran (THF) as a solvent at a weight ratio of 8:2 to prepare a 5 wt % polymer solution. Herein, PS-b-PEO was a copolymer including a polystyrene (PS) segment and polyethylene oxide (PEO) segment bound to each other at each end thereof. In the copolymer, the PS segment had a molecular weight (Mw) of 18.5 kg/mol and the PEO segment had a molecular weight (Mw) of 39 kg/mol. In addition, the weight fraction of the PS segment in PS-b-PEO was 25.73 wt %. Further, the weight fraction of the PS segment based on the total weight of PS and PS-b-PEO was 45.73 wt %. Herein, LiTFSI as a lithium salt was also introduced thereto at a molar ratio of [EO]/[Li$^+$]=18/1. The polymer solution was agitated overnight at 60° C. so that the PS-b-PEO, PS and lithium salt introduced thereto might be dissolved sufficiently. The polymer solution was coated on a release film through spin coating at 1000 rpm for 1 minute and dried overnight at room temperature under vacuum. In this manner, a solid electrolyte membrane was obtained. The resultant solid electrolyte membrane had a thickness of about 30 µm.

Example 3

A solid electrolyte membrane having a thickness of 30 µm was obtained in the same manner as Example 2, except that the polystyrene-polyethylene oxide block copolymer (polystyrene-co-polyethylene oxide, PS-b-PEO) as described hereinafter was used as the polymer material (A). The PS-b-PEO was a copolymer including a polystyrene (PS) segment and polyethylene oxide (PEO) segment bound to each other at each end thereof. In the copolymer, the PS segment had a molecular weight (Mw) of 60 kg/mol and the PEO segment had a molecular weight (Mw) of 18 kg/mol. In addition, the weight fraction of the PS segment in PS-b-PEO was 15.38 wt %. Further, the weight fraction of the PS segment based on the total weight of the polymer material and the solid electrolyte material was 41.12375 wt %.

Example 4

First, a polystyrene-polyethylene oxide block copolymer (polystyrene-co-polyethylene oxide, PS-b-PEO, ion conductivity: $5\times10^{-6}$ (at room temperature)) and polystyrene (PS, molecular weight (Mw): 7 kg/mol, glass transition temperature (Tg): 100° C.) were introduced to tetrahydrofuran (THF) as a solvent at a weight ratio of 9:1 to prepare a 5 wt % polymer solution. Herein, PS-b-PEO was a copolymer including a polystyrene (PS) segment and polyethylene oxide (PEO) segment bound to each other at each end thereof, wherein the PS segment had a molecular weight (Mw) of 16 kg/mol and the PEO segment had a molecular weight (Mw) of 110 kg/mol. Herein, LiTFSI as a lithium salt was also introduced thereto at a molar ratio of [EO]/[Li$^+$]

=18/1. The polymer solution was agitated overnight at 60° C. so that PS-b-PEO and lithium salt might be dissolved sufficiently. The polymer solution was coated on a release film through spin coating at 1000 rpm for 1 minute and dried overnight at room temperature under vacuum. In this manner, a solid electrolyte membrane was obtained. The resultant solid electrolyte membrane had a thickness of about 30 μm.

Comparative Example 1

Polyethylene oxide (PEO, $M_w$=4,000,000 g/mol) was dissolved in acetonitrile (AN) as a solvent to prepare a 4 wt % polymer solution. Herein, LiTFSI as a lithium salt was also introduced thereto at a molar ratio of $[EO]/[Li^+]$=18/1. The resultant mixture was agitated overnight at 70° C. so that PEO and lithium salt might be dissolved sufficiently in the polymer solution. Next, an additive solution containing an initiator and a curing agent was prepared. The curing agent was PEGDA ($M_w$=575), the initiator was benzoyl peroxide (BPO), polyethylene glycol diacrylate (PEGDA) was used in an amount of 20 wt % based on PEO, BPO was used in an amount of 1 wt % based on PEGDA, and acetonitrile was used as a solvent. The additive solution was agitated for about 1 hour so that the ingredients introduced thereto might be mixed thoroughly. Then, the additive solution was added to the polymer solution and the two solutions were mixed thoroughly. The mixed solution was applied to and coated on a release film by using a doctor blade. The coating gap was set to 800 μm and the coating rate was set to 20 mm/min. The release film coated with the coating solution was transferred to a glass plate, allowed to maintain level, dried overnight at room temperature, and vacuum dried at 100° C. for 12 hours. In this manner, a solid electrolyte membrane was obtained. The resultant solid electrolyte membrane had a thickness of about 50 μm.

2. High-Temperature Exposure Test

Two sheets of solid electrolyte membrane samples were prepared from each of Examples 1-4 and Comparative Example 1. Each sample was allowed to stand at room temperature, or exposed to 100° C., and recovered to determine ion conductivity. The results of ion conductivity determination are shown in the following Table 1.

Ion conductivity was determined by the following method. Each of the solid electrolyte membranes according to Examples 1-4 and Comparative Example 1 was cut into a circular shape with a size of 1.7671 cm². The solid electrolyte membrane was disposed between two sheets of stainless steel (SUS) to obtain a coin-cell. Then, electrochemical impedance was measured by using an analyzer (VMP3, Biologic science instrument) at 60° C. under the conditions of an amplitude of 10 mV and a scan range of 500 kHz to 20 MHz. Based on this, ion conductivity was calculated.

TABLE 1

|  | Temperature and retention time | Ion conductivity (S/cm, 60° C.) |
| --- | --- | --- |
| Example 1-1 | Room temperature | 2E−05(2 × 10⁻⁵) |
| Example 1-2 | 100° C. 10 hours | 4E−08(4 × 10⁻⁸) |
| Example 2-1 | Room temperature | 1E−05(1 × 10⁻⁵) |
| Example 2-2 | 100° C. 10 hours | 3E−08(3 × 10⁻⁸) |
| Example 3-1 | Room temperature | 1E−05(1 × 10⁻⁵) |
| Example 3-2 | 100° C. 10 hours | 4E−08(4 × 10⁻⁸) |
| Example 4-1 | Room temperature | 5E−05(5 × 10⁻⁵) |
| Example 4-2 | 100° C. 12 hours | 8E−08(8 × 10⁻⁸) |//

TABLE 1-continued

|  | Temperature and retention time | Ion conductivity (S/cm, 60° C.) |
| --- | --- | --- |
| Comp. Ex. 1-1 | Room temperature | 1E−04(1 × 10⁻⁴) |
| Comp. Ex. 1-2 | 100° C. 12 hours | 1E−04(1 × 10⁻⁴) |

It can be seen from the above results that each of the solid electrolyte membranes maintained under room temperature according to Examples 1-1, 2-1, 3-1 and 4-1 shows an ion conductivity within a range capable of battery driving, and each of the solid electrolyte membranes undergoing a decrease in ion conductivity under a high-temperature condition and maintained under a high-temperature condition for 10 hours or more according to Examples 1-2, 2-2, 3-2 and 4-2 shows a level of ion conductivity incapable of battery driving. In other words, the solid electrolyte membrane according to the present disclosure forms an inhibiting layer under a high-temperature condition to interrupt ion conduction effectively. However, the solid electrolyte membrane according to Comparative Example 1-2 maintains the same level of ion conductivity as the solid electrolyte membrane allowed to stand at room temperature according to Comparative Example 1-1. Therefore, it can be seen that the solid electrolyte membrane according to the present disclosure shows a rapid decrease in ion conductivity in a relatively short time under a high-temperature condition.

Figure 2:
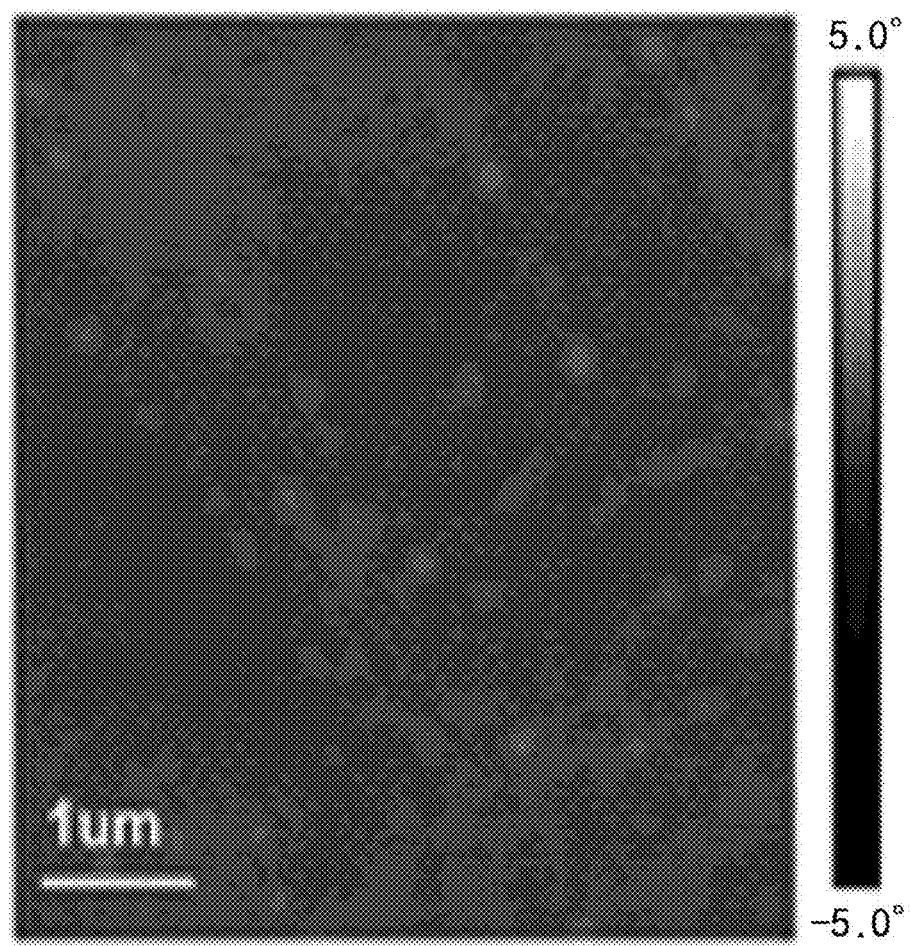
FIG. 2 and FIG. 3 show atomic force microscopic (AFM) phase-mode images of the solid electrolyte membranes according to Example 4-1 and Example 4-2, respectively.
Figure 3:
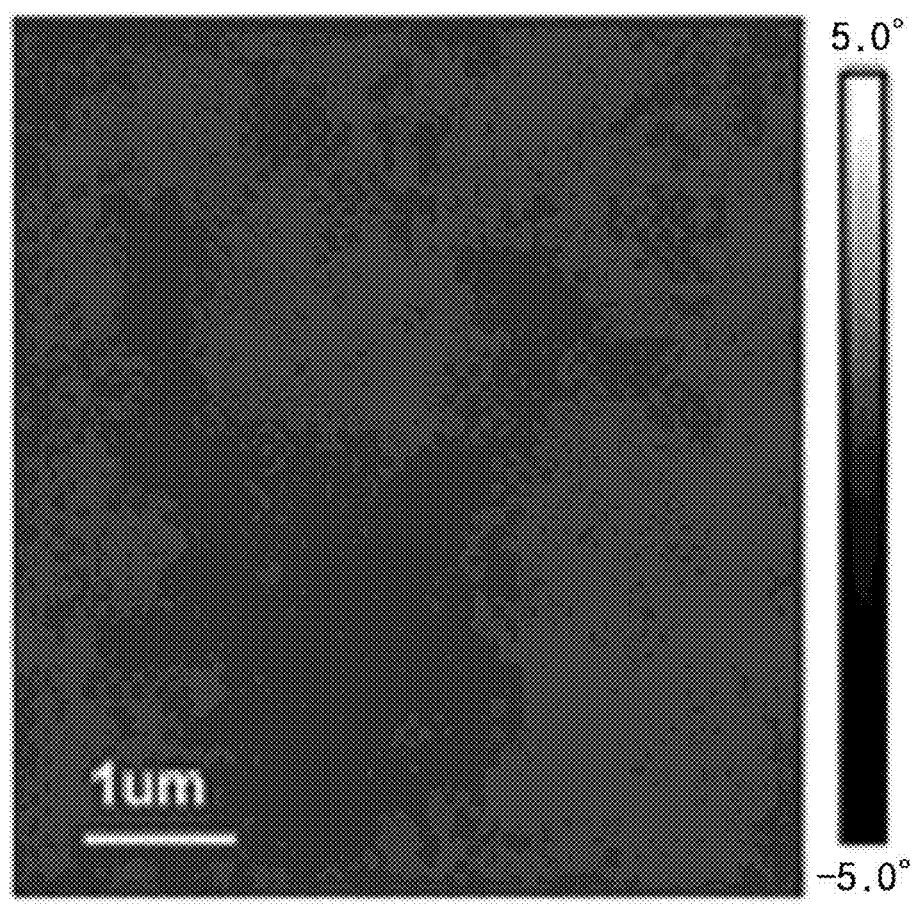

In addition, FIG. 2 and FIG. 3 show atomic force microscopic (AFM) phase-mode images of the solid electrolyte membranes according to Example 4-1 and Example 4-2, respectively. As can be seen from the morphology of each solid electrolyte membrane determined through the images, Example 4-1 includes polystyrene (white colored portion) distributed randomly in the solid electrolyte membrane. However, in the case of Example 4-2, no polystyrene is observed on the surface of the solid electrolyte membrane. This suggests that the solid electrolyte membrane according to the present disclosure forms an interrupting layer in the solid electrolyte membrane through the melting and phase separation of polystyrene, when being exposed to a high-temperature condition for a long time.

3. Manufacture of all-Solid-State Battery

NCM811 ($LiNi_{0.8}Co_{0.1}Mn_{0.1}O_2$) as a positive electrode active material, vapor grown carbon fibers (VGCF) as a conductive material, and a polymeric solid electrolyte (PEO+LiTFSI, a molar ratio of $[EO]:[Li^+]$=18:1) were mixed at a weight ratio of 80:3:17, and the resultant mixture was introduced to acetonitrile, followed by agitation, to provide electrode slurry. The slurry was applied to an aluminum current collector having a thickness of 20 μm, and the resultant product was vacuum-dried at 120° C. for 4 hours. Then, pressing was carried out by using a roll press to obtain an electrode having an electrode loading amount 2 mAh/cm², an electrode layer thickness of 48 μm and a porosity of 22 vol %.

The positive electrode was cut into a circular shape having an area of 1.4875 cm². In addition, lithium metal foil cut into a circular shape having an area of 1.7671 cm² was prepared as a counter electrode. Each of the solid electrolyte membranes obtained from Example 4 and Comparative Example 1 was interposed between the two electrodes to obtain a coin-type half-cell.

The discharge capacity of each battery was determined under the following condition. Each of the batteries according to Examples and Comparative Examples was charged/discharged under the following conditions to evaluate initial efficiency.

Charge condition: charged in a constant current (CC)/constant voltage (CV) mode at 0.05 C to 4.15 V (0.02C cut-off)

Discharge condition: discharged in a constant current (CC) mode to 3 V at 0.05 C Meanwhile, in the following Table 2, the discharge capacity of the battery according to Example 4-A is determined after 1 hour at 60° C., that of the battery according to Example 4-B is determined after 1 hour at 100° C., that of the battery according to Example 4-C is determined after 12 hours at 100° C., that of the battery according to Comparative Example 1-A is determined after 1 hour at 60° C., and that of the battery according to Comparative Example 1-B is determined after 12 hours at 100° C.

TABLE 2

| | Discharge capacity (mAh/g, 4.15 V) |
|---|---|
| Example 4-A | 142 |
| Example 4-B | 27 |
| Example 4-C | — |
| Comp. Ex. 1-A | 156 |
| Comp. Ex. 1-B | 158 |

As can be seen from Table 2, when each of the batteries of Examples 4-A, 4-B and 4-C using the solid electrolyte membrane according to the present disclosure is exposed to high temperature, the solid electrolyte membrane undergoes a rapid decrease in ion conductivity, and thus the driving of the battery may be controlled. Therefore, it is possible to ensure the heat resistance and safety of the battery.

What is claimed is:

1. A solid electrolyte membrane for an all-solid-state battery, the solid electrolyte membrane having an ion conductivity of $1 \times 10^{-7}$ S/cm or more at 20-30° C., and comprising a mixture of a polymer material (A) and a solid electrolyte material (B), wherein the polymer material (A) has an ion conductivity of $9 \times 10^{-8}$ S/cm or less at 20-30° C., the solid electrolyte material (B) comprises a polymer electrolyte (C) containing a lithium salt (C1) mixed with a polymer resin (C2), the polymer resin (C2) is a block copolymer comprising a first segment and a second segment different from the first segment, the first segment comprises a first repeating unit having a polar group, and a weight fraction of the first segment in the polymer resin (C2) is 70-99 wt %.

2. The solid electrolyte membrane for an all-solid-state battery according to claim 1, wherein the polymer material (A) is present in a weight fraction of 10-70 wt % based on 100 wt % of the solid electrolyte membrane.

3. The solid electrolyte membrane for an all-solid-state battery according to claim 1, wherein the solid electrolyte material (B) has an ion conductivity of $1 \times 10^{-7}$ S/cm or more at 20-30° C.

4. The solid electrolyte membrane for an all-solid-state battery according to claim 1, wherein the polymer material (A) comprises at least one selected from the following A1) to A6):

A1) a polyolefin-based polymer comprising at least one of ethylene, propylene, butylene and isobutylene as a repeating unit,
A2) a polystyrene-based polymer,
A3) a polyacrylate-based polymer,
A4) a polycarbide-based polymer,
A5) a polyester-based polymer, and
A6) a polylactone-based polymer.

5. The solid electrolyte membrane for an all-solid-state battery according to claim 4, wherein the polymer material (A) further comprises a copolymer comprising at least one segment-having selected from the group consisting of: a polyolefin-based repeating unit, a segment a polystyrene-based repeating unit, a polyacrylate-based repeating unit, a polycarbide-based repeating unit and a segment having a polyester-based repeating unit, and
further wherein the copolymer has an ion conductivity of $9 \times 10^{-8}$ S/cm or less at room temperature.

6. The solid electrolyte membrane for an all-solid-state battery according to claim 1, wherein the polymer resin (C2) comprises a block copolymer comprising a copolymer (PEO-b-PS) of the first segment containing an ethylene oxide repeating unit and the second segment comprises a styrene repeating unit.

7. The solid electrolyte membrane for an all-solid-state battery according to claim 6, wherein the polymer material (A) of the solid electrolyte membrane comprises polystyrene.

8. The solid electrolyte membrane for an all-solid-state battery according to claim 1, wherein the second segment is present at a weight fraction of 20-50 wt % based on 100 wt % of a total weight of the polymer material (A) and the polymer resin (C2).

9. The solid electrolyte membrane for an all-solid-state battery according to claim 1, which induces phase separation between the solid electrolyte material (B) and the polymer material (A) depending on a change in temperature to form an ion conduction-interrupting layer comprising the polymer material (A) in the solid electrolyte membrane, wherein the change in temperature is an increase in temperature.

10. The solid electrolyte membrane for an all-solid-state battery according to claim 4, wherein the polyacrylate-based polymer is a polymethyl methacrylate (PMMA).

11. The solid electrolyte membrane for an all-solid-state battery according to claim 4, wherein the polyester-based polymer is a polyethylene terephthalate (PET).

12. The solid electrolyte membrane for an all-solid-state battery according to claim 4, wherein the polylactone-based polymer is a polylactone.

13. The solid electrolyte membrane for an all-solid-state battery according to claim 1, wherein the polymer electrolyte material (B) has an ion conductivity of $1 \times 10^{-7}$ S/cm or more at room temperature, and the polymer resin (C2) comprises a first repeating unit having a polar group including at least one polar element selected from the group consisting of oxygen, nitrogen and sulfur.

14. The solid electrolyte membrane for an all-solid-state battery according to claim 1, wherein the first segment comprises at least one repeating unit selected from the group consisting of ethylene oxide, carbonate, amide, imide, aspartic acid, acrylonitrile, peptide, acrylate, urethane, acrylamide, acrylic acid, vinyl acetate, vinylidene chloride and methyl methacrylate.

15. The solid electrolyte membrane for an all-solid-state battery according to claim 1, wherein the first segment has a molecular weight of 10-200 kg/mol.

* * * * *